May 16, 1939. R. F. DE BOER Re. 21,080

SLIDING ASH RECEIVER

Original Filed Feb. 26, 1936 2 Sheets-Sheet 1

Inventor
Rudolph F. DeBoer
By Lucas and
Van Antwerp
Attorneys

May 16, 1939. R. F. DE BOER Re. 21,080
SLIDING ASH RECEIVER
Original Filed Feb. 26, 1936 2 Sheets-Sheet 2
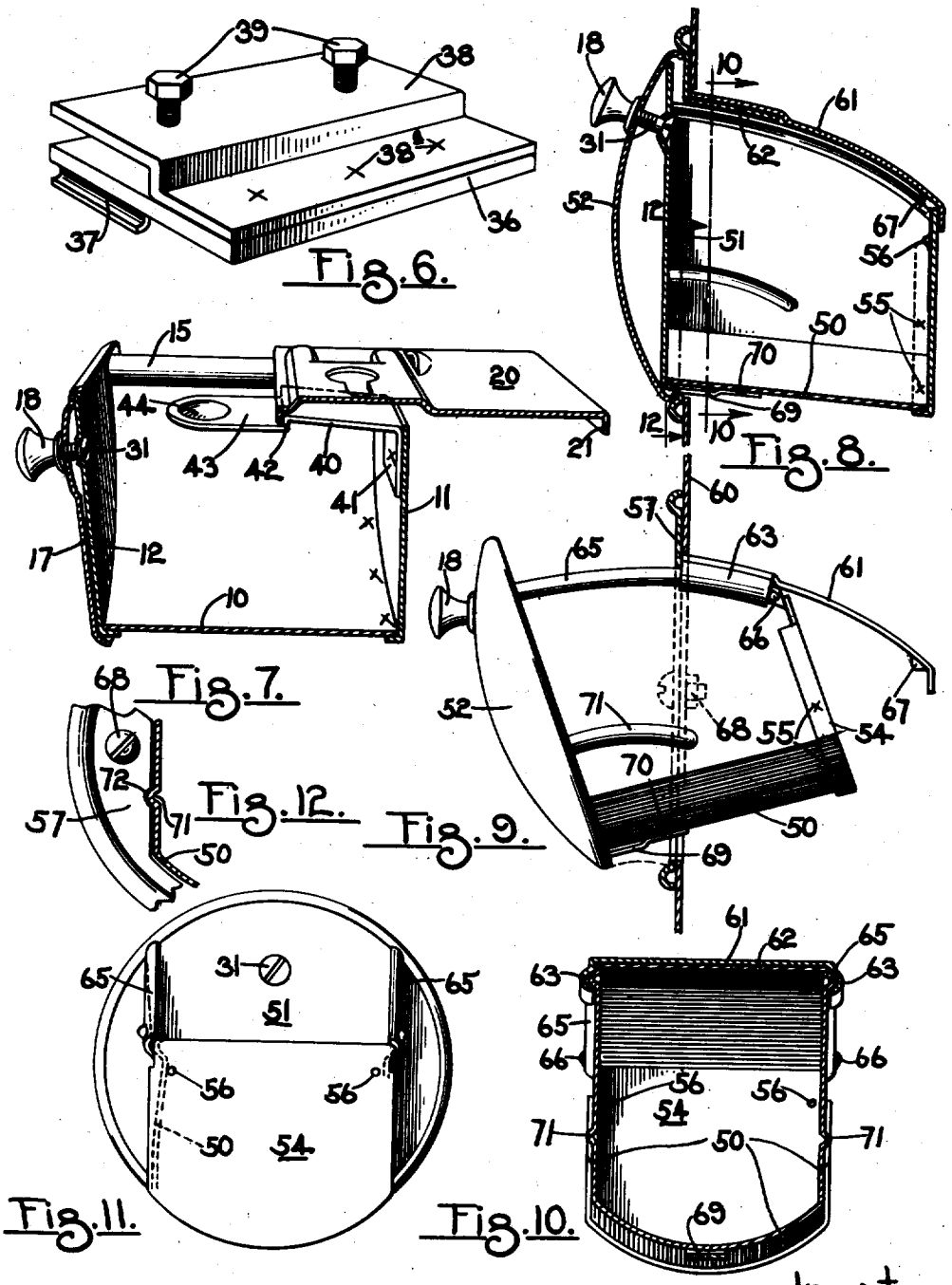
Inventor
Rudolph F. DeBoer
By Lemmons & Van Antwerp
Attorneys Reissued May 16, 1939

Re. 21,080

UNITED STATES PATENT OFFICE 21,080

SLIDING ASH RECEIVER

Rudolph F. De Boer, Grand Rapids, Mich., assignor to Applied Arts Corporation, a corporation of Michigan Original No. 2,043,886, dated June 9, 1936, Serial No. 65,785, February 26, 1936. Application for reissue January 31, 1938, Serial No. 189,179

18 Claims. (Cl. 206—19.5)

This invention relates generally to an ash receiver and more particularly to one adapted to slide to and from closed position and also be detached whenever desired. The ash receiver is conveniently used upon the dash of an automobile.

One of the main advantages of my invention lies in its easy detachability. This detachability is had by simply withdrawing the ash container to its open position and then pressing the sides thereof toward one another whereby the container is released. Thus, it can be bodily removed and emptied.

Along this same line is another means of detachment, this being accomplished by withdrawing the container to an open position and then bodily forcing the same downwardly whereupon a certain camming action between the yieldable sides of the container and the guides therefor permits downward withdrawal of the container.

It is to be noted that the container is only detachable when it is slid to an open position.

With respect to the first mentioned method of bodily removing the container, it will be realized that the simple act of grasping the container, usually from underneath, causes inward movement of the resilient sides and thus this might be said to be a natural and almost instinctive method of detaching the container.

Another feature of advantage resides in the simplicity of the device whereby it may be economically constructed.

Another advantage lies in the double movement of the container. This double movement, namely, a withdrawal and also a tilting movement, causes the upper open end of the container to move to a wide open position while at the same time the lower portion is restricted to less than one-half the first mentioned movement and thus the open top of the container is tilted to a convenient angle.

Another advantage resides in the means for attaching the container onto the instrument panel of the automobile.

Other advantages and objects will appear as the following description is read and understood.

In the drawings:

Fig. 6 illustrates a modified form of attaching means.

Fig. 7 illustrates in perspective cross section a modification of my invention.

Fig. 8 is a cross sectional view through another modified form of my invention.

Fig. 9 is a side view showing the container of Fig. 8 extended to an open position.

Fig. 10 is a sectional view taken along the line 10—10 of Fig. 8.

Fig. 11 is a rear view of the ash container proper which is further illustrated in Figs. 8, 9, 10 and 12.

Fig. 12 is a sectional view taken along the line 12—12 of Fig. 8.

Like numerals refer to like parts throughout their views.

Figure 1:
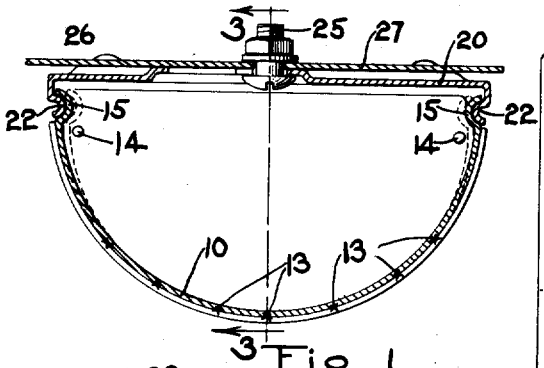
Fig. 1 is a cross sectional view through the container showing its sliding movement upon the mounting plate, this plate being held in position by a single screw.

Referring to Figs. 1 to 5, inclusive, numeral 10 illustrates the bottom of the ash container. This bottom is of semi-cylindrical form and has semicircular ends 11 and 12 welded thereto. The rear end 11 is welded to the bottom 10 as indicated at 13. See Figs. 1 and 3. It will be noted that the upper rear edges of the semi-cylindrical plate 10 are free to move inwardly under pressure so as to assume the dotted line position shown in Fig. 1. The end 11 has extensions 14 whereby the inward movement of the rear corners of the member 10 are limited.

Figure 4:
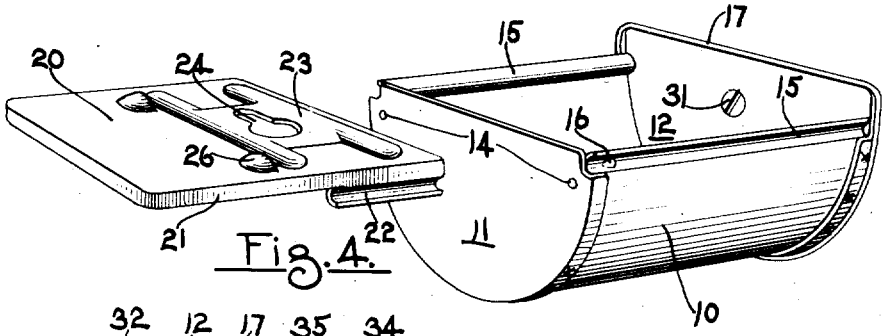
Fig. 4 is a perspective view of the container and its mounting plate.

As clearly shown in Figs. 1 and 4, the upper edges of the plate member 10, forming the bottom and sides of the container, are curved outwardly at 15 and have stops 16 thereon as shown.

The front of the container is covered by an ornamental plate 17 which is held thereto by the knob means 18, and the screw 31. See Figs. 2 and 3.

Figure 2:
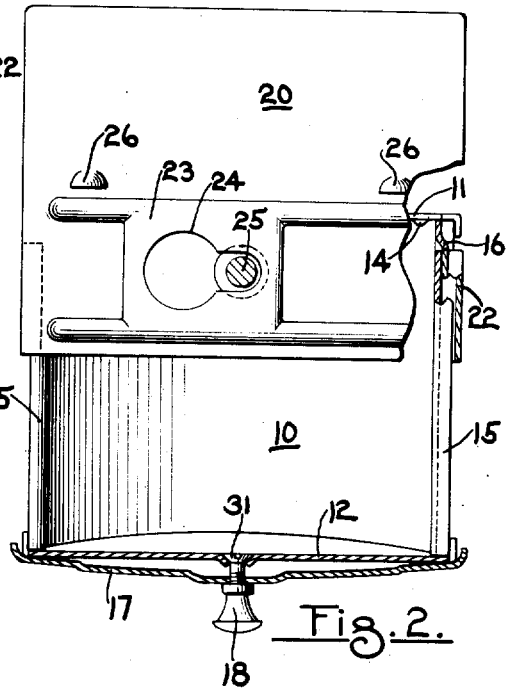
Fig. 2 is a plan view of the container and its mounting plate the container being extended to an open position.
Figure 3:
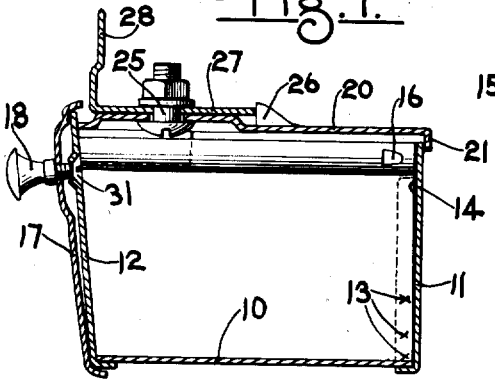
Fig. 3 is a sectional view taken along the line 3—3 of Fig. 1.

As shown in Figs. 2 and 4, a mounting plate 20 has a depending flange 21 partly therearound and curved portions 22 depend downwardly as shown to form curved guides. These guides 22 slide in the guideways formed by the outcurved edges 15 of the sides of the container. If desired, the guiding portions 22 may extend the full length of plate 20 and be slotted to receive limiting projections 16, the slots extending only partially along the length of the plate. The depending flange 21 prevents leakage of smoke and air from the sides and rear of the container when closed. The body portion of the mounting plate 20 is stamped upwardly at 23 and a key-hole slot 24 is formed therein. The embossing 23 serves to strengthen the plate 20 and also positions the plane of the keyhole slot 24 upwardly whereby interference between the head of the attaching bolt 25 and the rear wall 11 of the container is prevented.

The plate 20 also carries upstruck lugs 26. These lugs 26, see Fig. 3, abut against the horizontal portion 27 of the instrument panel 28 to properly locate the plate 20.

Figure 5:
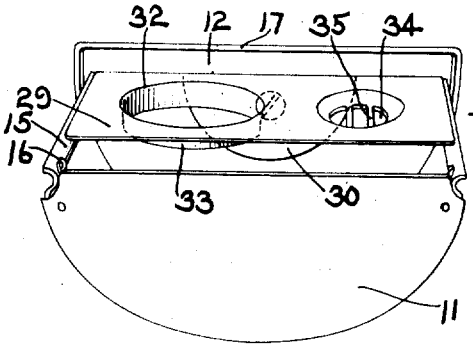
Fig. 5 is a perspective view looking from the rear showing an air shielding plate in operative position.

Another phase of my invention involves the placing of a shielding plate 29 over only the front portion of the container as shown in Fig. 5. The shielding plate 29 has a depending flange 30 which is held against the inside of the front 12 by means of the same screw 31 which enters the knob 18. Thus this screw serves a double purpose. The shielding means has an opening 32 having a depending flange 33 therearound and a second smaller opening 34 carrying cross members 35 whereby the ashes on the cigar or cigarette may be flicked therefrom.

Referring now to Fig. 6, numeral 36 indicates a modified form of mounting plate which has depending guides 37. These guides function similarly to the curved guides 22 previously referred to, see Fig. 4. A plate 38 is welded at 38a onto one side of the mounting plate 36 and has a portion raised and spaced from said plate 36 through which clamping screws 39 are threaded whereby the construction may be clamped onto the instrument panel. The panel is received in the space formed between these two members.

A modification of my ash container and its mounting is shown in Fig. 7, this modification being constructed similarly to the one shown in Figs. 1 to 4, except that a spring plate 40 is welded interiorly of the rear wall 11 as indicated at 41. This flexible plate is shouldered at 42 and terminates in a finger lug 43 which has a depression 44 formed therein as shown, this depression receiving the lighted end of the cigar as desired. Also, the mounting plate 20 is so constructed as to have a front flange which abuts against the shoulder 42 to limit the normal outward movement of the container. Whenever desired, downward pressure upon the lug 43 permits bodily withdrawal of the container.

Referring to Figs. 8 to 12, inclusive, numeral 50 indicates a plate which forms the bottom and side walls of the container. A front wall 51 is attached in any suitable manner and an ornamental plate 52 is held thereagainst by means of the knob 18 and its attaching screw 31. The rear wall 54 is welded to the bottom and sides 50 as indicated at 55 and thus the upper rear corners of this container are yieldable inwardly to the dotted line position shown in Fig. 11. Stops 56 limit this movement.

A protecting and mounting plate 57, see Fig. 9, surrounds the opening through the panel 60 and a shielding member 61 is welded to the inwardly extending flange 62, this flange 62 extending integrally from the encircling plate 57. As clearly shown in Fig. 9 the member 61 has oppositely disposed guide members 63 curved as illustrated in Fig. 10 and the upper side walls of the member 50, similarly curved as indicated at 65, ride in these guideways 63. Detents 66 prevent excess outward movement of the container under normal conditions. The member 61 is offset downwardly as shown to form a tightly fitting cover for the container, also, the member 61 is flexible and carries the extension 67 which springs over the rear wall of the container to frictionally hold it in closed position.

The side walls of the element 50 have raised out-struck arcuate guides 71. These guides extend the distance shown in Fig. 9 and are of the cross sectional shape shown in Fig. 12.

The mounting plate 57 is notched on opposite sides at 72, see Fig. 12, to slidably receive the guides 71. Thus the receiver proper is guided at these two lower points.

It will be apparent that the ash container may be drawn outwardly to the position shown in Fig. 9 and that during this movement the top portion thereof will move through a much greater distance than the bottom front edge. This is very desirable inasmuch as the knob of the gear shift lever travels closely adjacent to the instrument panel and my construction gives a maximum of clearance between these elements.

The mounting plate 57 is held onto the instrument panel by means of screws 68. A spring member 69, see Figs. 8 and 9, shaped as shown, is welded at 70 onto the bottom member 50. The member 59 is flexible and contacts the plate 57 of the panel 60 when the container is closed, see Fig. 8, to prevent rattling of the container.

To detach the container shown in Figs. 8 to 12, inclusive, the same is withdrawn outwardly to open position and then its sides are compressed to the dotted line position shown in Fig. 11 whereupon the detents 66 are released. This permits complete withdrawal. Reinsertion of the container is obtained by reversal of the above described action.

From the above description it will be understood that my constructions permit one to easily remove the ash container by grasping the same with but one hand, the gripping pressure automatically releasing the detent which locks the same in position. In the modification shown in Fig. 7, the thumb of the emptier readily contacts the spring arm 43 and this likewise permits one handed manipulation.

The invention is defined in the appended claims and is to be considered comprehensive of all forms of structure coming within their scope.

I claim:

1. An ash container of the class described comprising a bottom member having upwardly extending portions to form sides thereon, a back member attached to said bottom and side members, a front member attached to the bottom and said side members, an ornamental panel extending exteriorly of said front member, a shielding plate extending across the top of the container, said shielding plate having a depending lug contacting the front of the container, and means extending through the depending lug, the front and the ornamental panel to hold said members in assembled relationship.

2. In combination, a mounting plate having a depending flange therearound, said mounting plate having an embossing at one end thereof, a keyhole slot formed in said embossing, upstruck alined lugs adjacent the said embossing, guideways formed on the mounting plate adapted to receive an ash container.

3. In an ash receiver, in combination with a container and a support therefor, means for slidably and releasably mounting said container on said support, said means comprising a slidable guide member attached to said support and a second slidable guide member attached to said container, said guide members having interlocking and sliding engagement with each other acting to support the weight of the container, one of said guide members being so mounted as to be capable of yielding out of its normal position for the purpose of disengaging said guide members thereby releasing said container from said support.

4. The elements of claim 3 in combination with coacting stop means on the container and support respectively acting to limit the sliding movement of the container, said stop means being so located as to be disengaged by said yielding movement of said guide member.

5. The elements of claim 3 combined with coacting stop means on said guide members, said stop means being disengageable by said yielding movement of said guide member.

6. The elements of claim 3 in which the longitudinal dimensions of said guide members extend in corresponding arcuate paths.

7. An ash receiver comprising a supporting slide, a container having a yieldable side, a slide on said yieldable side interlocking with said supporting slide to slidably support the weight of the container, said slides being disengageable by flexing said yieldable side to remove said container.

8. The elements of claim 7 in which the longitudinal dimensions of said slides extend in corresponding arcuate paths.

9. The elements of claim 7 combined with coacting stop means to limit the sliding movement of the container and so located as to be disengageable by the flexing of said side.

10. An ash receiver comprising a supporting slide, a container having a bottom, front, back and opposed side members, said sides being rigidly connected to said front and one of said sides being laterally movable relative to said back, a slide on one of said sides coacting with said supporting slide to slidably support said container and disengageable therefrom by said lateral movement when the container is partly extended.

11. The elements of claim 7 combined with means for limiting the yielding movement of said yieldable side.

12. The elements of claim 10 combined with means for limiting the yielding movement of that part of said movable side relative to said back.

13. A device of the class described comprising, a mounting member, a container movably mounted on said mounting member, said container having a front, back and sides, one of said sides having a stop near its upper edge to normally engage said mounting means to limit the movement of the container relative to the mounting means and said side having said stop being connected to said back near its lower portion and unconnected from said back near its upper portion whereby it may be flexed sufficiently to disengage said stop from said mounting means.

14. The elements in combination defined in claim 13 combined with means for limiting the flexing movement of said side relative to said back.

15. The elements in combination defined in claim 13 combined with means to limit the flexing movement of said side in both directions laterally of its plane.

16. A device of the class described comprising, a mounting member, a container movably mounted relative to said mounting member, said container having a bottom, front, back and vertical sides, one of said vertical sides having a portion unconnected from said back, a stop on said side on its unconnected part normally engageable with said mounting member to limit movement of said container, said unconnected part of said side being yieldable to disengage said stop from said mounting member.

17. The elements in combination defined in claim 16 combined with means on said container structure to limit the flexing movement of the unconnected part of said side.

18. A device of the class described comprising, a mounting member, a container, means for movably mounting said container on said mounting member including members having sliding contact with each other, means for maintaining said container in mounted relation to said mounting member, a flexible side on said container having a part connected and another part unconnected from the remainder of the structure, and means for releasing said container for removal from said mounting member actuated by flexing said unconnected part of said side.

RUDOLPH F. DE BOER.